US008261884B2

(12) United States Patent
Palmer

(10) Patent No.: US 8,261,884 B2
(45) Date of Patent: Sep. 11, 2012

(54) MECHANICAL ENERGY STORAGE SYSTEM

(76) Inventor: Stephen T. Palmer, Ocean Grove, NJ (US)

( * ) Notice: Subject to any disclaimer, the term of this patent is extended or adjusted under 35 U.S.C. 154(b) by 102 days.

(21) Appl. No.: 12/950,438

(22) Filed: Nov. 19, 2010

(65) Prior Publication Data

US 2011/0120806 A1    May 26, 2011

Related U.S. Application Data

(60) Provisional application No. 61/263,109, filed on Nov. 20, 2009.

(51) Int. Cl.
*F03G 1/00* (2006.01)
(52) U.S. Cl. .................................................. 185/41 C
(58) Field of Classification Search ............... 185/37, 185/40 A, 40 B, 40 C, 40 D, 40 E, 40 H, 185/40 K, 40 L, 40 M, 40 R, 40 S
See application file for complete search history.

(56) References Cited

U.S. PATENT DOCUMENTS

| 3,986,580 | A | 10/1976 | Dennis |
| 5,269,197 | A | 12/1993 | Yang |
| 6,769,323 | B2 * | 8/2004 | Barreiro ................. 74/129 |
| 2002/0170786 | A1 * | 11/2002 | Bucher ................. 188/185 |

* cited by examiner

*Primary Examiner* — Thomas R Hannon
*Assistant Examiner* — Phillip A Johnson
(74) *Attorney, Agent, or Firm* — Henry M. Feiereisen, LLC

(57) ABSTRACT

A mechanical energy storage system includes a containment vessel, a drive shaft operatively connected to a generator/motor and supported for rotation in the containment vessel. A support structure is attached to the drive shaft and configured for radial extension from a rest position proximate the drive shaft. A resilient member having a mass and extending circumferentially around the drive shaft is connected to free ends of the support structure and configured to store elastic energy when the support structure extends radially from its rest position. Upon rotation of the drive shaft, the resilient member stores both elastic and rotational energy commensurate with its mass and elastic properties.

8 Claims, 2 Drawing Sheets

MECHANICAL ENERGY STORAGE SYSTEM

CROSS-REFERENCES TO RELATED APPLICATIONS

This application claims the benefit of prior filed U.S. provisional Application No. 61/263,109, filed Nov. 20, 2009, pursuant to 35 U.S.C. 119(e).

BACKGROUND OF THE INVENTION

The present invention relates to a mechanical energy storage system.

The following discussion of related art is provided to assist the reader in understanding the advantages of the invention, and is not to be construed as an admission that this related art is prior art to this invention.

U.S. Pat. No. 3,986,580 to Dennis discloses a solid state energy storage system having a plurality of metal strips which are joined with a plurality of springs. The metal strips are rotatable upon a drive shaft allowing the springs to elongate, and energy being stored in the springs.

U.S. Pat. No. 5,269,197 to Yang discloses a device for the storage and release of energy having a body rotatably connected to a center shaft and two fins pivotably connected to the body. The pins have arms which each have an inertia block on an end of the respective arm. The arms are connected to the body by springs. A hood connected to the center shaft deflects an air stream toward the fins and the fins are pivoted rearwardly, radially displacing the inertia arms by centrifugal force. When the force of the air stream decreases, the springs urge the inertia blocks to return and stored energy is released, sustaining the rotation of the body.

It would be desirable and advantageous to provide an improved energy storage system to obviate prior art shortcomings.

SUMMARY OF THE INVENTION

According to one aspect of the present invention, a mechanical energy storage system includes a containment vessel, a drive shaft operatively connected to a generator/motor and supported for rotation in the containment vessel, support structure attached to the drive shaft and configured for radial extension from a rest position proximate the drive shaft, a resilient member having a mass and extending circumferentially around the drive shaft, said resilient member connected to free ends of the support structure and configured to store elastic energy when the support structure extends radially from their rest position, wherein upon rotation of the drive shaft, the resilient member stores both elastic and rotational energy commensurate with its mass and elastic properties.

An energy storage device according to the present invention replaces a conventional disk or cylinder of the flywheel with a circular spring. The circular spring stores energy both rotationally and mechanically at the same time. As a result, the energy storage system may store more energy than a flywheel design of similar mass because centrifugal force is absorbed by the mechanical resistance of the expanding spring rather than acting against the tensile strength of the flywheel material. Thus centrifugal force is stored mechanically, rather than acting only as an undesirable limiting effect that tends to force the flywheel to "fly" apart. RPS will, of course, be much lower, but the rotational mass can be much greater.

Another advantage of an energy storage device according to the present invention is that the circular spring is scalable. The materials for all components may be variable.

The material of the helical spring may be any high-tensile-strength, resilient material, including but not restricted to, steel, aluminum, carbon fiber, nylon, etc.

According to another advantageous feature of the present invention, the containment vessel can be evacuated.

According to another advantageous feature of the present invention, the elastic and rotational energy may be supplied to the resilient member by a motor.

According to another advantageous feature of the present invention, the elastic and rotational energy may be recovered from the resilient member and supplied to a generator.

According to another advantageous feature of the present invention, the support structure may be constructed in the form of brackets pivotally attached to the drive shaft.

According to another advantageous feature of the present invention, the resilient member may be a spring. Currently preferred is a spring in the form of a circular helical spring.

According to another advantageous feature of the present invention, the resilient member may be realized by a plurality of springs stacked vertically on an axis.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
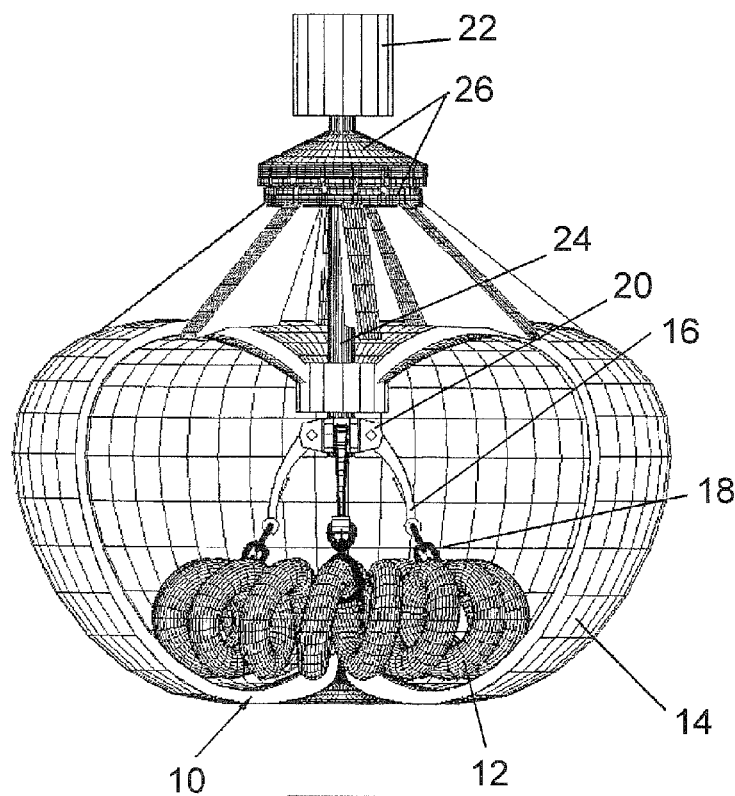
FIG. 1 is a schematic illustration of one embodiment of an energy storage device according to the present invention and embodied in an exemplary containment vessel, with the energy storage device at rest.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This application involves the concept of storing mechanical energy by way of a rotating body, embodied here as circular springs and attached by a linkage, such as supporting arms, to a drive shaft. The application does not intend to seek protection for an electric generator/motor, or magnetic levitation devices which are shown here only to illustrate the environment in which the rotating body may be mounted and to which the rotating body may be operatively connected. Moreover, the size and number of loops of the spring can vary according to the materials or scale of any specific implementation. The supporting arms and containment vessel/vacuum chamber shown here are for illustration only and may be optimized depending on the desired application.

Turning now to the drawing, and in particular to FIG. 1, there is shown a schematic illustration of one embodiment of an energy storage device according to the present invention, generally designated by reference numeral 10. The energy storage device includes a circular spring 12 placed, by way of example, in a containment vessel 14 and connected via support arms 16 to a drive shaft 24. The circular spring 12 simultaneously stores rotational and mechanical, e.g. elastic, energy where upon rotation of the drive shaft 24 inside the containment vessel 14, the circular spring 12 is able to expand outwardly allowing the centrifugal force to be stored by the expanding spring due to its elastic properties in addition to the moment of inertia of the expanded spring.

Figure 2:
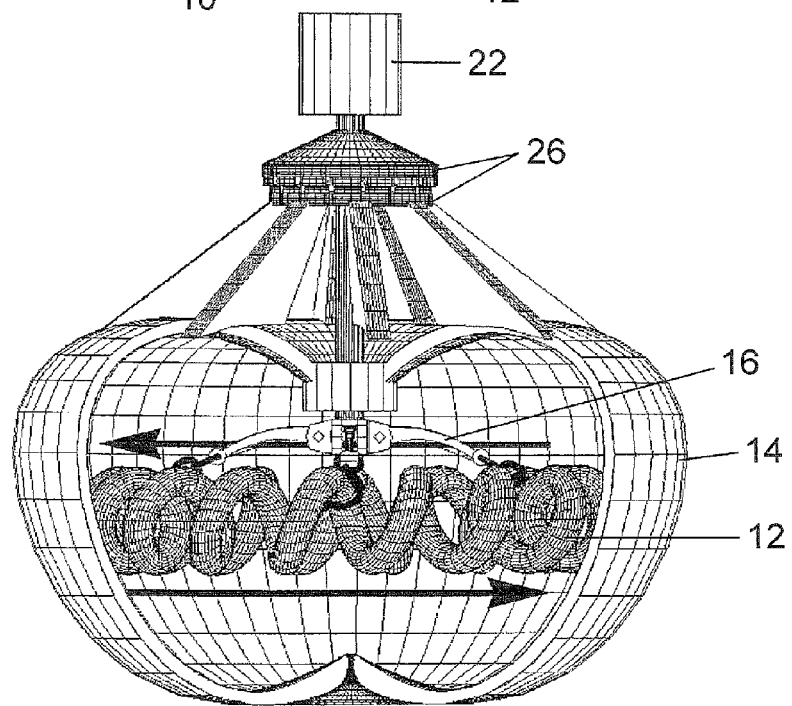
FIG. 2 is a schematic illustration of the energy storage device at high rotational speed.

FIG. 1 shows the circular spring 12 at rest, whereas FIG. 2 shows the circular spring 12 in an expanded state when the drive shaft 24 inside the containment vessel 14 rotates. The circular spring 12 is supported by support arms 16 having one end articulated to chain links 18 and an opposite end articulated to a bracket 20, such as to allow for upward and outward movement of the spring. Chain links provide a simple solution for accommodating the deformation of the expanding spring 12. The support arms 16 and the bracket 20 need only be dimensioned to sufficiently support the weight of the circular spring 12 and to hold it in position.

The containment vessel 14 for the spring may be vacuum sealed and is mounted to a generator/motor 22. The rotor (not shown) of the generator/motor 22 is operatively connected to the drive shaft 24 and supported on the containment vessel 14 by a strong bearing, such as a bearing having opposing magnetic disks 26 operating through levitation. In this exemplary embodiment, one of the disks 26 is connected to the drive shaft 24, whereas the other disk 26 is stationary on the containment vessel 14. The levitation force may be generated by permanent magnets, same poles facing, with superconducting magnets and the like.

The illustrated shape of the containment vessel 14 is shown by way of example only. Other shapes, such as a simple capped cylinder, are also feasible.

Figure 3:
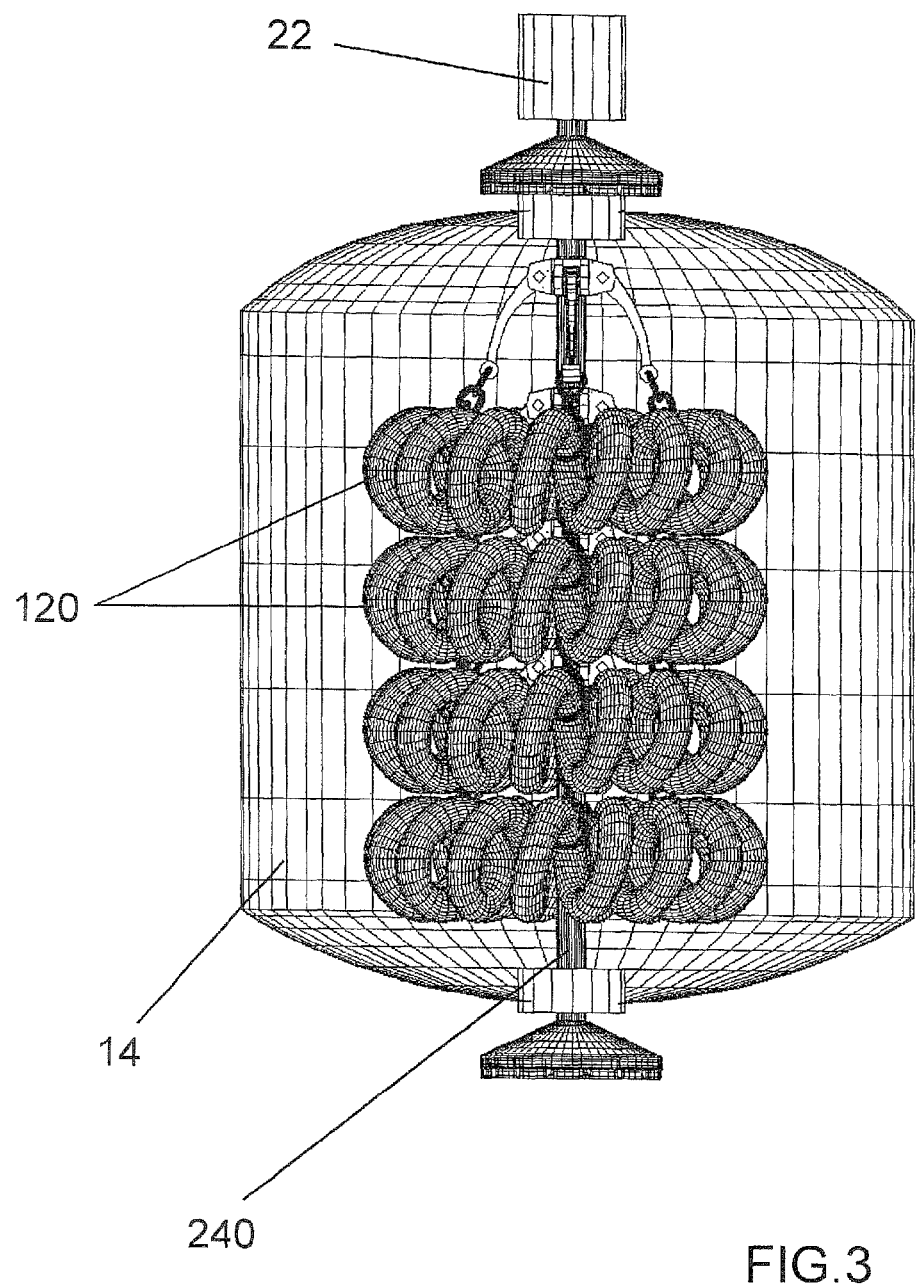
FIG. 3 is a schematic illustration of another embodiment of an energy storage device according to the present invention and embodied in an different type of containment vessel.

FIG. 3 shows a schematic illustration of another embodiment of an energy storage device according to the present invention. Parts corresponding to those in FIG. 1 are denoted by identical reference numerals and not explained again. The description below will center on the differences between the embodiments. In this embodiment, an assembly of a plurality of springs 120 is employed, instead of a single circular helical spring, in an exemplary containment vessel 14. The springs 120 are hereby placed above one another vertically along a driveshaft 240 to thereby increase the energy storage capacity. Vertical in this context denotes a direction substantially parallel to the rotation axis of the drive shaft 240. Compared to the embodiment of FIGS. 1 and 2, the drive shaft 240 is extended to an area below the assembly of springs 120 and anchored at the bottom of the containment vessel 14 for stability purposes.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A mechanical energy storage system, comprising:
   a containment vessel;
   a drive shaft operatively connected to a generator/motor and supported for rotation in the containment vessel;
   a support structure attached to the drive shaft and configured for radial extension from a rest position proximate the drive shaft; and
   a resilient member having a mass and extending circumferentially around the drive shaft, said resilient member connected to free ends of the support structure and configured to store elastic energy when the support structure extends radially from the rest position;
   wherein upon rotation of the drive shaft, the resilient member stores both elastic and rotational energy commensurate with the mass and elastic properties.

2. The energy storage system of claim 1, wherein the containment vessel is evacuated.

3. The energy storage system of claim 1, wherein the elastic and rotational energy is supplied by the motor to the resilient member.

4. The energy storage system of claim 1, wherein the elastic and rotational energy is recovered from the resilient member and supplied to the generator.

5. The energy storage system of claim 1, wherein the support structure is configured in the form of brackets pivotally attached to the drive shaft.

6. The energy storage system of claim 1, wherein the resilient member is a spring.

7. The energy storage system of claim 6, wherein the spring is a circular helical spring.

8. The energy storage system of claim 1, wherein the resilient member comprises a plurality of springs stacked vertically on an axis substantially parallel to a rotation axis of the drive shaft.

* * * * *